US012688547B2

(12) United States Patent (10) Patent No.: US 12,688,547 B2
Goss et al. (45) Date of Patent: Jul. 21, 2026

(54) METHOD AND SYSTEM FOR COMBINING MULTIPLE SCANS INTO A SINGLE DATA SET

(71) Applicant: BrightAI Corporation, San Francisco, CA (US)

(72) Inventors: Ryan James Goss, Prior Lake, MN (US); Graham David Ferris, Savage, MN (US); Mark Norgren, Savage, MN (US); Robert Parker, Hillsborough, CA (US); Daniel John Benjamin, Savage, MN (US); John Tafoya, Franklin, TN (US)

(73) Assignee: BrightAI Corporation, Palo Alto, CA (US)

( * ) Notice: Subject to any disclaimer, the term of this patent is extended or adjusted under 35 U.S.C. 154(b) by 301 days.

(21) Appl. No.: 18/405,245

(22) Filed: Jan. 5, 2024

(65) Prior Publication Data

US 2024/0236242 A1 Jul. 11, 2024

Related U.S. Application Data

(60) Provisional application No. 63/437,570, filed on Jan. 6, 2023.

(51) Int. Cl.
G06T 3/14 (2024.01)
G01B 11/00 (2006.01)
(Continued)

(52) U.S. Cl.
CPC .............. G06T 3/14 (2024.01); G01B 11/002 (2013.01); G01B 11/22 (2013.01); G01B 11/28 (2013.01);
(Continued)

(58) Field of Classification Search
CPC .... G06T 3/14; G06T 7/30; G06T 7/33; G06T 7/337; G06T 7/38; G06T 7/50;
(Continued)

(56) References Cited

U.S. PATENT DOCUMENTS 10,627,512 B1 4/2020 Hicks
11,049,267 B2 * 6/2021 Selviah ..................... G06T 7/33
(Continued)

OTHER PUBLICATIONS

International Search Report and Written Opinion, prepared by Examiner Taina Matos, of the United States Patent and Trademark Office, as ISA, mailed Mar. 26, 2024, in corresponding International Patent Application PCT/US2024/010475.

*Primary Examiner* — Scott A Rogers
(74) *Attorney, Agent, or Firm* — Shumaker & Sieffert, P.A.

(57) ABSTRACT

An improved method can be obtained for combining multiple data sets of a single subject to form a single representation of the subject, such as an environment. The method uses a small set of alignment points and scanning the environment from a first position, repositioning the scanning system to take a scan of the same environment from a second position, and labeling the same alignment points to the extent they are visible from the second location. The alignment points may be static points of interest in the environment or they may be placed in the environment by the user to denote the location of common reference points.

20 Claims, 6 Drawing Sheets

(51) Int. Cl.

| | |
|---|---|
| *G01B 11/22* | (2006.01) |
| *G01B 11/26* | (2006.01) |
| *G01B 11/27* | (2006.01) |
| *G01B 11/28* | (2006.01) |
| *G06T 7/30* | (2017.01) |
| *G06T 7/33* | (2017.01) |
| *G06T 7/38* | (2017.01) |
| *G06T 7/50* | (2017.01) |
| *G06T 7/55* | (2017.01) |
| *G06T 7/70* | (2017.01) |
| *G06T 7/73* | (2017.01) |

(52) U.S. Cl.
CPC .............. *G01B 11/285* (2013.01); *G06T 7/30* (2017.01); *G06T 7/337* (2017.01); *G06T 7/38* (2017.01); *G06T 7/55* (2017.01); *G06T 7/74* (2017.01); *G01B 11/26* (2013.01); *G01B 11/27* (2013.01); *G01B 11/272* (2013.01); *G06T 7/33* (2017.01); *G06T 7/50* (2017.01); *G06T 7/70* (2017.01); *G06T 7/73* (2017.01); *G06T 2207/10028* (2013.01)

(58) Field of Classification Search
CPC .... G06T 7/55; G06T 7/70; G06T 7/73; G06T 7/74; G06T 2207/10028; G01B 11/002; G01B 11/22; G01B 11/26; G01B 11/27; G01B 11/272; G01B 11/28; G01B 11/285
See application file for complete search history.

(56) References Cited

U.S. PATENT DOCUMENTS

| | | | | |
|---|---|---|---|---|
| 11,501,492 | B1 * | 11/2022 | Li | G06T 17/05 |
| 11,714,193 | B1 * | 8/2023 | Foster | G01S 7/4808 |
| | | | | 356/4.01 |
| 12,412,288 | B2 * | 9/2025 | Wohlfeld | G01S 7/497 |
| 2016/0314593 | A1 | 10/2016 | Metzler et al. | |
| 2017/0123066 | A1 | 5/2017 | Coddington et al. | |
| 2017/0236299 | A1 | 8/2017 | Valkenburg et al. | |
| 2018/0101934 | A1 * | 4/2018 | Cai | G06T 7/73 |
| 2019/0298480 | A1 | 10/2019 | Choudhry et al. | |
| 2019/0387216 | A1 | 12/2019 | Hicks | |
| 2020/0043186 | A1 | 2/2020 | Selviah et al. | |
| 2020/0408913 | A1 | 12/2020 | Pompe et al. | |
| 2021/0157001 | A1 | 5/2021 | Novel et al. | |
| 2024/0233410 | A1 | 7/2024 | Goss et al. | |

* cited by examiner

112

114

112

114

METHOD AND SYSTEM FOR COMBINING MULTIPLE SCANS INTO A SINGLE DATA SET

RELATED APPLICATION

This application claims the benefit of Provisional Patent Application No. 63/437,570 filed on Jan. 6, 2023 entitled "Method and System for Combining Multiple Scans into a Single Data Set."

BACKGROUND

Field of the Invention

This invention generally relates to a data processing method of combining multiple data sets and more particularly to a method for combining data from multiple scans of a single environment into a single data set.

Description of Related Art

There are some environments where you cannot see the entire area which you would like to measure, or you can gather more information about the environment from a different perspective. This means that multiple sets of measurements must be taken from different locations or at different times. The merging of these individual measurements is challenging, error prone, and time consuming. Existing systems rely on line of sight to all measurement positions. When there is an obstruction in the scene existing systems must break the scene into multiple measurements which must then be manually combined. The multiple measurements are error prone for referencing different positions. With existing systems there is no overview or feedback on the accuracy of the combined measurements.

Existing solutions utilize large data sets with thousands or millions of data points to heuristically identify features and points of interest to be used as the key alignment vectors to compute the transformation. These data sets are expensive in the hardware components and data processing to perform the calculations.

As such there still remains a need for an improved method of combining multiple data sets, such as multiple scans of a single environment, that enable scanning in more conditions and large environments, improve efficiency by being able to show augmented data in real (or near real) time, and better works around and reduces errors resulting from obstructions.

BRIEF DESCRIPTION OF THE INVENTION

An improved method can be obtained for combining multiple data sets of a single subject to form a single representation of the subject, such as an environment. The method uses a small set of alignment points and scanning the environment from a first position, repositioning the scanning system to take a scan of the same environment from a second position, and labeling the same alignment points to the extent they are visible from the second location. The alignment points may be static points of interest in the environment or they may be placed in the environment by the user to denote the location of common reference points. Preferably the alignment points may be chalk, tape, signs or other fiducial markings that are known in advance and can be detected by the scanning system.

BRIEF DESCRIPTION OF FIGURES

For a more complete understanding of the present invention and for further advantages thereof, reference is now made to the following description taken in conjunction with the accompanying drawings in which.

DESCRIPTION OF THE PREFERRED EMBODIMENTS

The present invention can be better understood by the following discussion of the manufacture and use of certain preferred embodiments.

One preferred embodiment involves the scanning of an outdoor environment, such as a backyard. Such an environment is too large to capture with sufficient detail from a single location since there are often obstacles, such as trees or buildings, that will obstruct part of the environment from a single scan location. The measurement device will be moveable around the measurement scene and will combine the measurement data from the one or more locations into a single set of measurements or schematics.

Another preferred embodiment allows for an environment to add additional measurements and information to be gathered from the scene. Sometimes the measured environment may have some changes, such as a new additional feature, removal of an object or change of materials worth noting and measuring with the device. The measuring device will allow an operator to return to the same location, or a different location within the environment to add measurements at a later time.

In a preferred embodiment, the measurement device is composed of one or more visual capture devices, one or more depth measuring device, one or more positional sensor, a data processing engine, and a command and control application. The measurement device will be mounted on a tripod or other fixed position and will be repositioned around the measurement scene at specific locations. In other embodiments the device will also be hand-held, wheeled or otherwise mobile during the scanning process to move around obstructions. Particularly preferred is the use of the measuring device disclosed in Provisional Application No. 63/437,561 titled "Measuring Device and Method of Use" and filed on the same day as this application and which is incorporated herein by reference.

Figure 1:
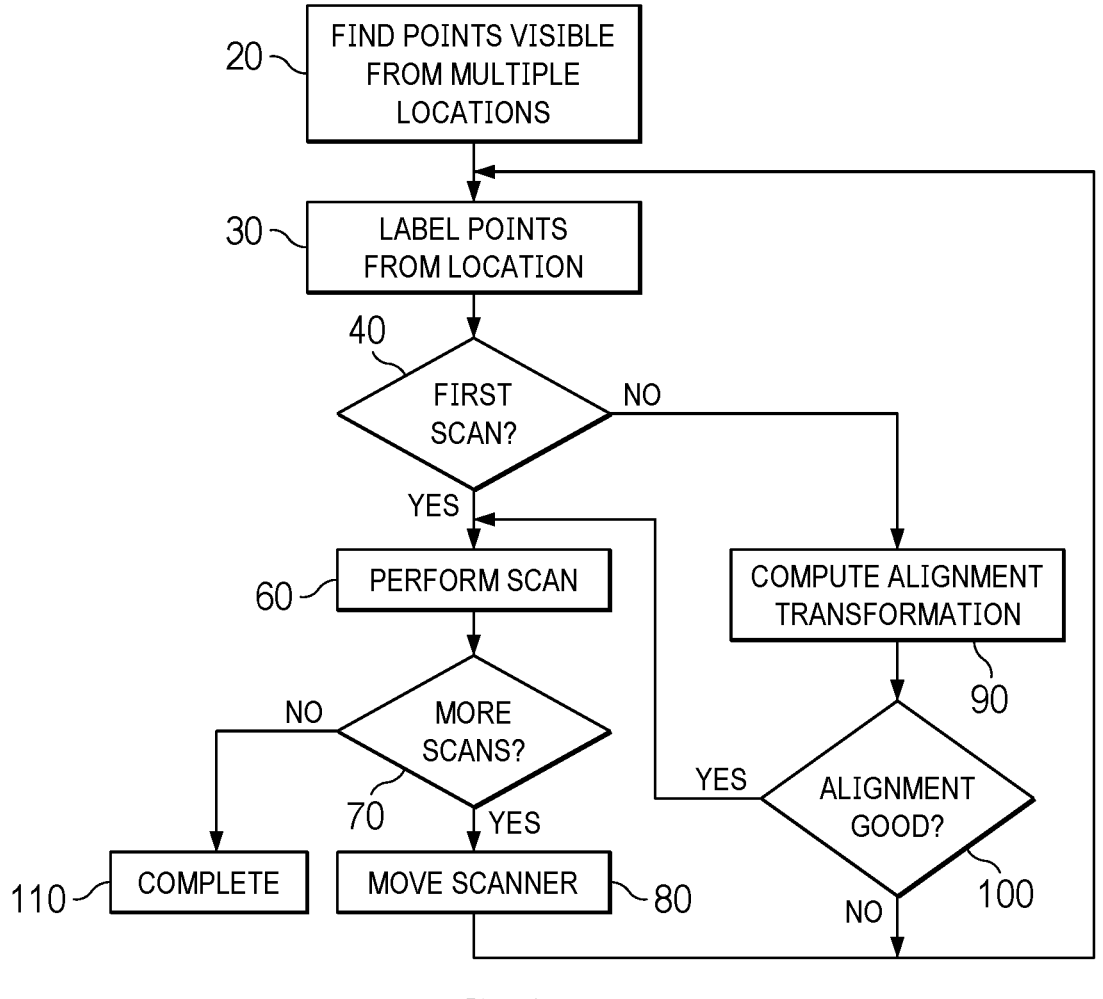
FIG. 1 is a flowchart showing a preferred embodiment that uses a multi-scan process.

FIG. 1 depicts a flow chart of the overall method of a preferred embodiment of the current invention. Generally, in a preferred embodiment, the method involves positioning a scanning system in a first location in the environment to be scanned. In step 20, a small set of alignment points are identified in the environment that are visible from multiple locations. In step 60, the environment is scanned from the first location and then, since this is the first scan, in step 80 the scanning system is moved to a second location in the environment. In step 30, the same set of alignment points are labeled from this second location. Since this is not the first scan, as determined in step 40, the system in step 90 then determines a transformation for the second scan to align the alignment points with those of the prior scans. This includes the possibility for manual calibration of orientation and perspective by the user so the same alignment points are always the same relative origin of measurement. If the user determines the transformed alignment is accurate in step 100, the environment is scanned from the second location in step 60. If not, the user repositions the measuring device and/or re-labels the alignment points back from the second location at step 30 and has the system re-determine a transformation for the second scan in step 90. Once the second scan is completed, the scanner is moved to another location in step 80 and the process is repeated from step 30 by labelling the alignment points from the new location. This process is repeated until the user has obtained the desired number of scans of the environment, which will preferably be determined based on the complexity of the environment and the number of obstructions present. At this point, in step 70 it is determined that no more scans are required and the process proceeds to step 110 where it is completed.

If the user has measured the environment at least once at a previous time and must come back to the same environment again then the same set of alignment points are labeled from a selected location at this new time. The location may be the same as the first scan or any prior scans, or may be from a new location, as long as the alignment points are labeled and the calibrated transformation looks correct.

The alignment points may be static elements that are already present in the environment, such as the corner of a building or patio. Alternatively, the alignment point can be placed in the environment for the purpose of providing common reference points. This might be chalk, tape, signs or other fiducial markings that are known to be detected. Particularly preferred is the use of unique fiducial markings that are known to the scanning system in advance and can be automatically identified as alignment points when taking each of the scans. For example, a sheet containing a high contrast icon or design that would not normally be present in the environment can be used as a fiducial marking.

Preferably, in order to combine the data from multiple datasets with a minimal set of alignment points, all of the selected alignment points are visible from all the locations a scan of the environment will be taken. However, it is possible to use one or more alignment points that are not visible from a subset of the scanning locations, provided that at least a minimum number of alignment points are shared between each of the scans.

The minimum number of alignment points that are visible from each location will be at least 3. Preferably, the number of alignment points are at least 4 or more in order to improve the alignment accuracy and minimize any error from the transformation. If the number of alignment points is less than 3, then there are multiple possible methods to combine the different locations and inaccurate measurements will occur. If fewer than 3 points are visible then the measurement system will display an error to the user to find and label additional alignment points. It is also preferred that the number of alignment points selected are less than 100 and more preferably less than 6. While a larger number of alignment points can be used, it is less effective as it increases the amount of time the user needs to conduct the scan and does not provide a significant improvement in the resulting combined scan.

When the scanning system is first set these alignment point locations are preferably chosen and labeled using a mobile device via an app that uses an application program interface (API) to connect to the software on the scanning system wirelessly. This can be accomplished automatically using image recognition software to identify the preselected fiducial markings that were placed in the environment. Alternatively, the user can manually select the alignment points from an image of the environment as viewed from the first scan location that is depicted on the screen of the mobile device. Once the alignment points are identified, the scanner will record the position (e.g. XYZ coordinates) for each of the alignment points. On the subsequent scans the set (or a subset) of the alignment points are retargeted from the new location and are similarly identified either automatically or by the user. The scanner will now have multiple data sets representing the same collection of alignment points.

The measurement device will use the alignment data sets to attempt to compute a common frame of reference for all data points and a transformation to combine all of the data points. This is accomplished by carrying out iterations of rotational and translational transformations to minimize the difference between the original points and the transformed points. Prior to the transformation each data set will have a different frame of reference. The absolute position of the alignment points will be common between the multiple locations and the data processing engine will match and align the data points by attempting to find common characteristics between the labeled alignment points. The characteristics used for alignment will include, but are not limited to, distance between points, edge length of segments, normal vector alignment, and error distance after transformation. The specifics of the characteristics used for alignment will allow for the small set of alignment data points to be uniquely identified so as to allow the transformation to be determined.

Figure 5:
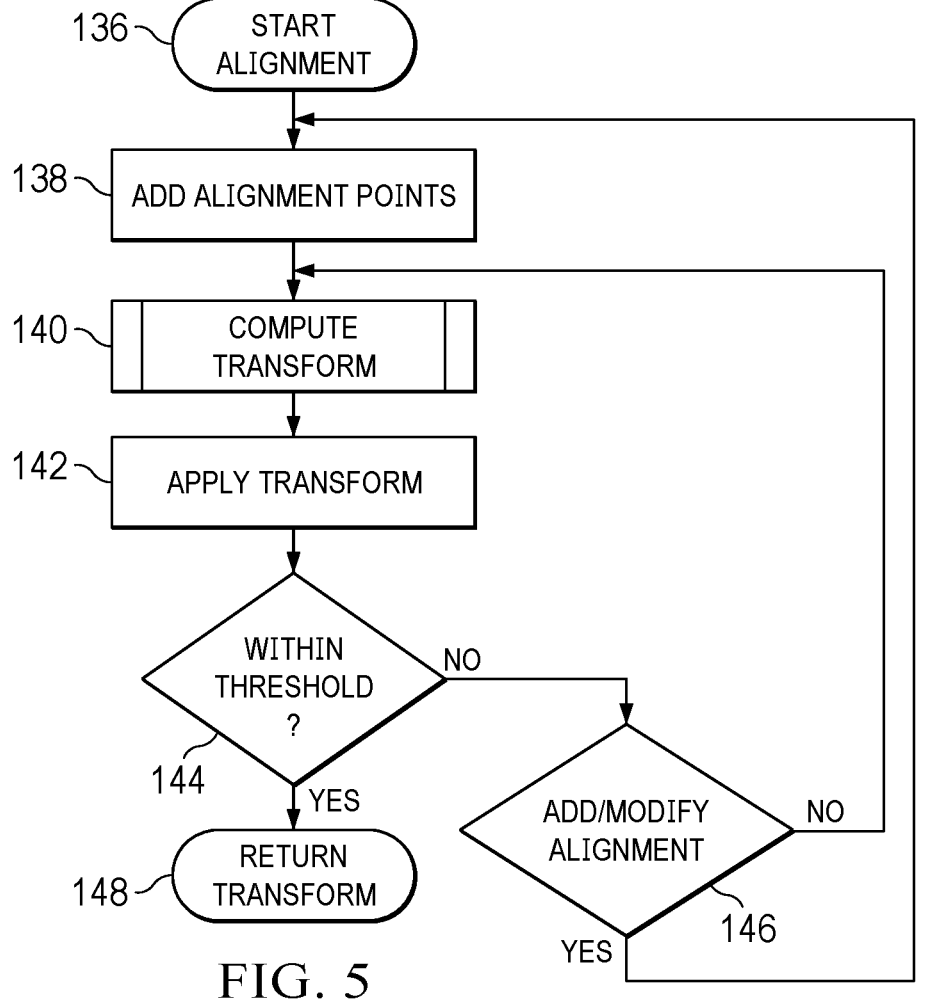
FIG. 5 is a flow chart showing the process for determining the alignment transformation.

As shown in FIG. 5 the process to determine the common frame of reference will be iterative to calculate a transformation (step 140), apply the computed transformation (step 142), and compare the alignment characteristics (step 144), where the iteration will continue until the transformation alignment is within the prescribed error threshold (as determined at step 144). During the iterations it is possible for the measurement device and the user to add, modify, or delete the alignment points (steps 146 and 138). This can include removal of inaccurate or noisy points which may cause errors in the alignment process. The iteration may also include repositioning or re-measuring a subset of alignment points. When the operation is complete there will be transformation information returned (step 148) to allow the measurement device to apply to all subsequent measurements within the scene.

All data points collected will utilize the computed transformation information in order to combine the data sets into a common reference frame. In typical cases there may be rotation about all 3 rotation axes (Pitch, Roll, Yaw) as well as translation shift of distance (XYZ). The common reference frame may be chosen as the frame of reference for one of the scans, or a complete independent frame of reference into which all data is translated.

Figure 2A:
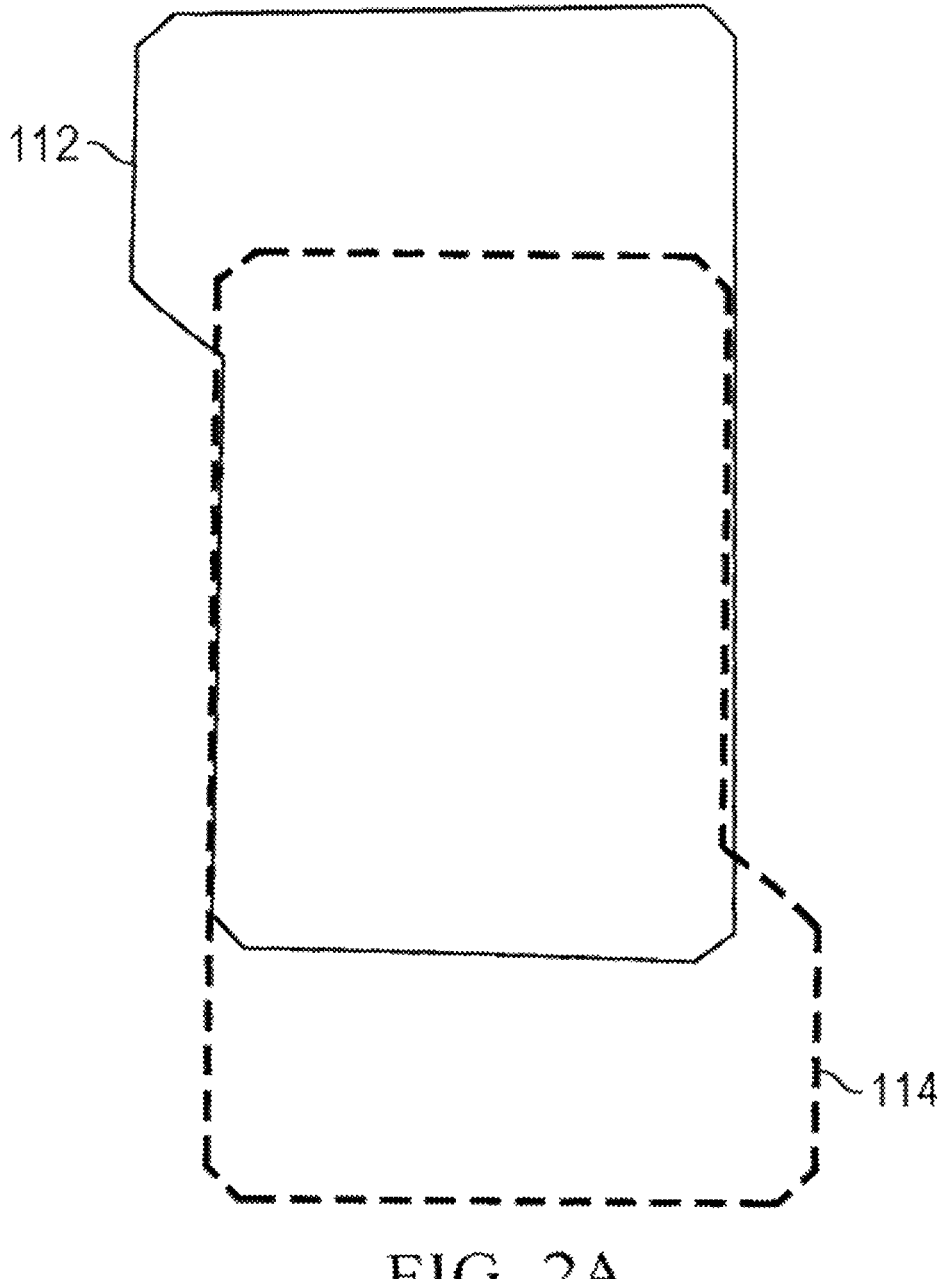
FIG. 2A shows two scans of a single environment where the alignment points are not aligned.
Figure 2B:
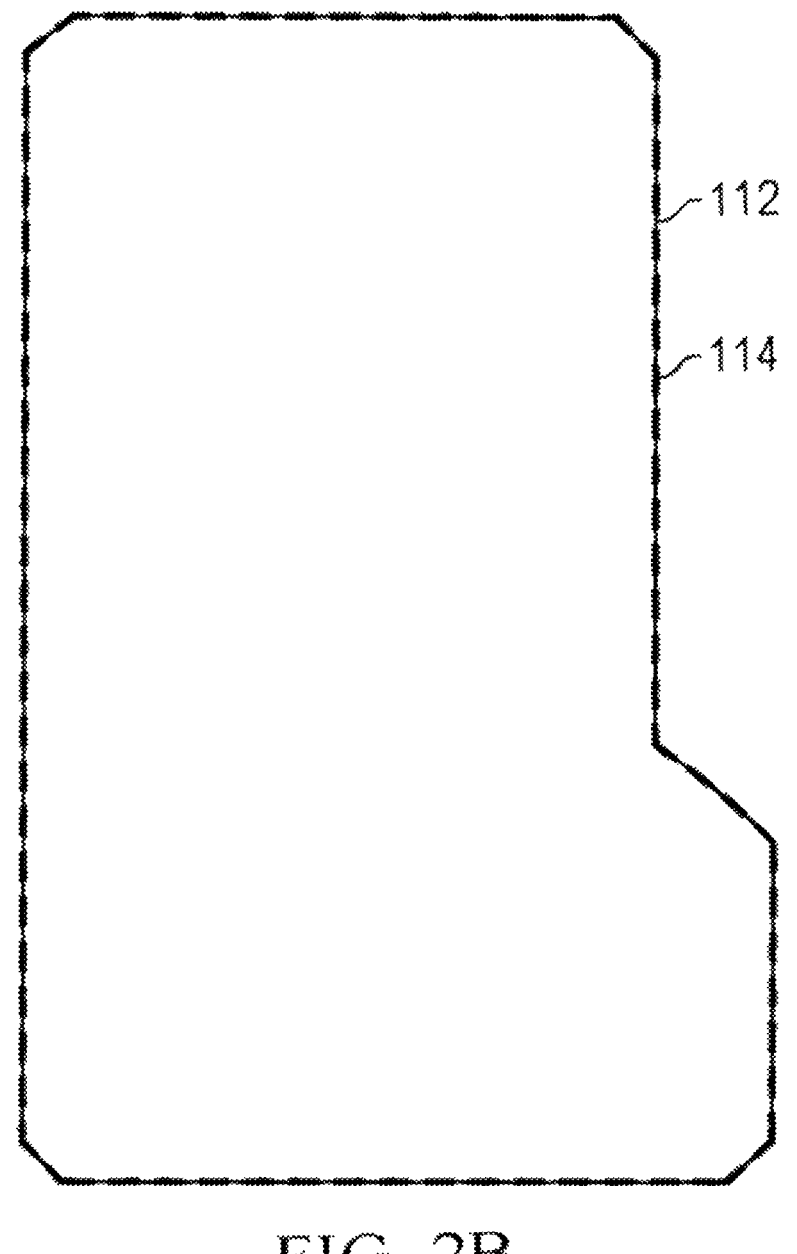
FIG. 2B shows the two scans depicted in FIG. 2A where the alignment points have been used to transform the scans so they align.
Figure 3:
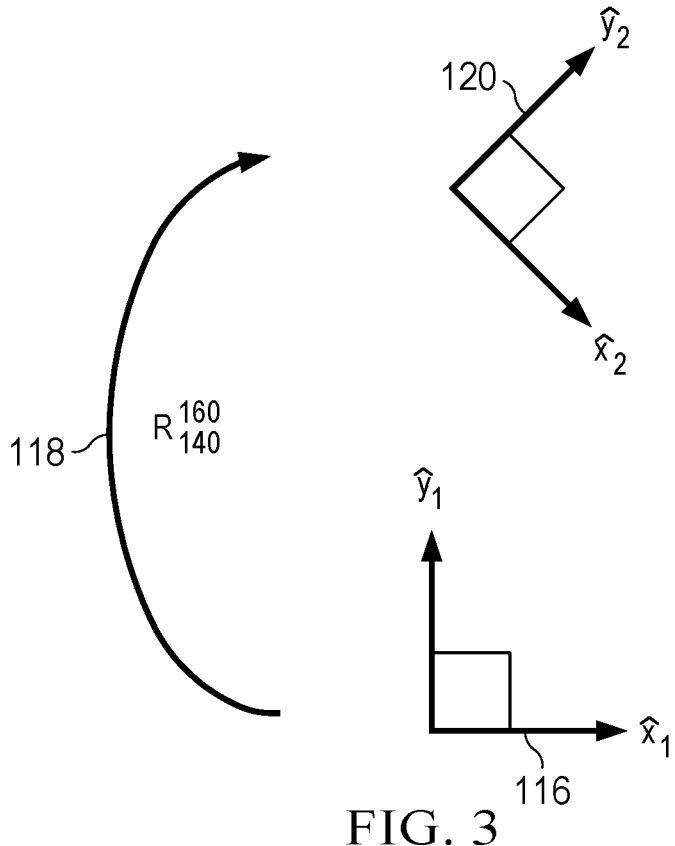
FIG. 3 shows an example transformation that would be involved in combining two scans where the scanner has been turned at a 450 angle between the two scans.

FIG. 3 shows a simple example of a transformation would be rotation about one of the axes. If the scanner is simply turned at a 450 angle in the azimuth between the two scans, the transformation would be a rotation about the azimuth axis and would be calculated as shown in FIG. 3. Specifically, scan 116 would be rotated 45° per transformation 118 to result in scan 120. This can also be seen in FIGS. 2A and 2B. In FIG. 2A, two scans have resulted in data set 112 and data set 114. FIG. 2B shows the result after a transformation has been applied to data set 120 to combine the data sets 112 and 114.

1. Real Time Representation

The computed transformation with the common frame of reference is used to adapt all data from the scanning system so that the output information for the user interface and application API is always in the common frame of reference. This means that the labeled points of interest, measurements and other data from the scanner will be shown in such a way that the multiple scans appear as a single data set. This augmentation of the data set will occur in real-time (or near real-time) so that while in the measuring environment the scanning system automation and the user interface can validate the combined data sets for accuracy and validity to ensure the multiple scans look and act as a single continuous scan.

Figure 4:
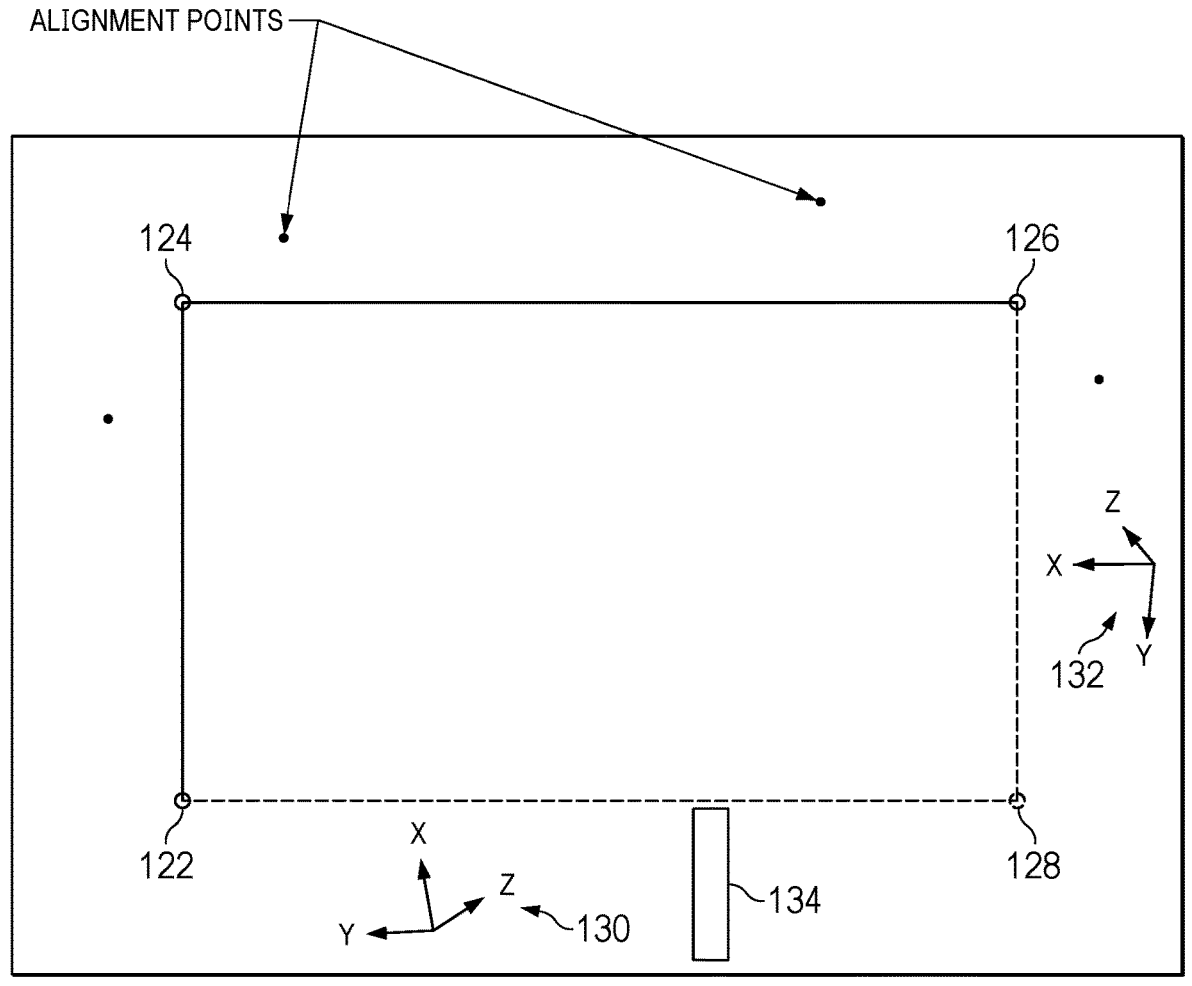
FIG. 4 is a depiction of a preferred embodiment of the invention in an environment containing a rectangular feature and an obstruction.

FIG. 4 shows an example of a preferred embodiment of the method being used to scan a backyard that contains a rectangular pool. In this example there are 4 alignment points (122, 134, 126, 128). All of the alignment points are not visible from both the first scan position 130 and second scan position 132 locations. Points 122, 124, 126, and 128 are points of interest in this environment, namely the four corners of the rectangular pool. Points 122, 124, and 126 are visible from the first scan location 130, but point 128 is not visible from the first scan location 130 due to the obstruction 134. Scan 1 begins with setting the alignment points. Preferably, the visible points of interest (122, 124 and 126) can be labeled in the Scan 1 as well. Then the scanner is physically moved and reoriented to the second scan location 132 where the same alignment points are labeled. After the alignment and registration phase on Scan 2 the overlay of the data is now combined between the 2 scans so that as Scan 2 labels the point of interest 128 it is shown in relative position to the previous labeled points (122, 124, and 126) to form a single unified data set from a common frame of reference.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A method comprising:

creating a first scan of an environment by at least scanning the environment from a first location using a scanning system;

selecting a set of alignment points, wherein each of the set of alignment points is included in the first scan;

obtaining a modified set of alignment points, wherein at least one alignment point is different between the set of alignment points and the modified set of alignment points;

creating a second scan of the environment by at least scanning the environment from a second location using the scanning system, wherein each of the modified set of alignment points is included in the second scan; and combining, by the scanning system and using the modified set of alignment points, the first scan and the second scan to form a single representation of the environment.

2. The method of claim 1, wherein selecting the set of alignment points comprises obtaining, by the scanning system, a selection of the set of alignment points from static elements in the environment.

3. The method of claim 1, wherein selecting the set of alignment points comprises identifying, by the scanning system, fiducial markers added to the environment.

4. The method of claim 1, wherein the set of alignment points comprises at least four alignment points and at least three alignment points are visible from each of the first scan and the second scan.

5. The method of claim 1, wherein selecting the set of alignment points comprises receiving, by the scanning system and from a mobile device, a selection of the set of alignment points.

6. The method of claim 1, wherein selecting the set of alignment points comprises identifying, by the scanning system and using image recognition software, the set of alignment points included in the first scan.

7. The method of claim 1, wherein combining the first scan and the second scan comprises applying a transformation to one or more of the first scan and the second scan to align each of the modified set of alignment points included in the first scan and the second scan within the single representation.

8. The method of claim 7, wherein applying the transformation comprises iteratively calculating the transformation until each of the modified set of alignment points within the first scan and the second scan are aligned within a preselected threshold.

9. The method of claim 1, wherein obtaining the modified set of alignment points comprises adding an alignment point to the set of alignment points to obtain the modified set of alignment points.

10. The method of claim 1, wherein obtaining the modified set of alignment points comprises deleting an alignment point from the set of alignment points to obtain the modified set of alignment points.

11. A scanning system comprising:

a visual capture device configured to create a first scan of an environment by at least scanning the environment from a first location;

a processing unit configured to execute instructions that cause the processing unit to:

select a set of alignment points, wherein each of the set of alignment points is included the first scan; and obtain a modified set of alignment points, wherein at least one alignment point is different between the set of alignment points and the modified set of alignment points, wherein the visual capture device is further configured to create a second scan of the environment by at least scanning the environment from a second location, wherein each of the modified set of alignment points is included in the second scan, and wherein the instructions further cause the processing unit to combine, using the modified set of alignment points, the first scan and the second scan to form a single representation of the environment.

12. The scanning system of claim 11, wherein, to select the set of alignment points, the instructions further cause the processing unit to obtain a selection of the set of alignment points from static elements in the environment.

13. The scanning system of claim 11, wherein, to select the set of alignment points, the instructions further cause the processing unit to identify fiducial markers added to the environment.

14. The scanning system of claim 11, wherein the set of alignment points comprises at least four alignment points and at least three alignment points are visible from each of the first scan and the second scan.

15. The scanning system of claim 11, wherein, to select the set of alignment points, the instructions further cause the processing unit to receive, from a mobile device, a selection of the set of alignment points.

16. The scanning system of claim 11, wherein to select the set of alignment points, the instructions further cause the processing unit to identify, using image recognition software, the set of alignment points included in the first scan.

17. The scanning system of claim 11, wherein, to combine the first scan and the second scan, the instructions further cause the processing unit to apply a transformation to one or more of the first scan and the second scan to align each of the modified set of alignment points included in the first scan and the second scan within the single representation.

18. The scanning system of claim 11, wherein, to obtain the modified set of alignment points, the instructions further cause the processing unit to add an alignment point to the set of alignment points to obtain the modified set of alignment points.

19. The scanning system of claim 11, wherein, to obtain the modified set of alignment points, the instructions further cause the processing unit to delete an alignment point from the set of alignment points to obtain the modified set of alignment points.

20. A non-transitory computer readable storage medium storing instructions that, when executed by a processing unit, cause the processing unit to:

obtain a first scan of an environment created by a visual capture device by at least scanning the environment from a first location;

select a set of alignment points, wherein each of the set of alignment points is included the first scan; and obtain a modified set of alignment points, wherein at least one alignment point is different between the set of alignment points and the modified set of alignment points, obtain a second scan of the environment created by the visual capture device by at least scanning the environment from a second location, wherein each of the modified set of alignment points is included in the second scan; and combine, using the modified set of alignment points, the first scan and the second scan to form a single representation of the environment.

* * * * *